United States Patent [19]

McGrogan, Jr.

[11] 3,863,215

[45] Jan. 28, 1975

[54] DETECTOR FOR REPETITIVE DIGITAL CODES

[75] Inventor: Ellwood Patrick McGrogan, Jr., Cherry Hill, N.Y.

[73] Assignee: RCA Corporation, New York, N.Y.

[22] Filed: July 3, 1973

[21] Appl. No.: 376,222

[52] U.S. Cl. .............. 340/146.1 BA, 340/146.1 AX

[51] Int. Cl. ........................ G06f 11/08, G08c 25/00

[58] Field of Search ......... 340/146.1 BA, 146.1 AX, 340/172.5

[56] References Cited

UNITED STATES PATENTS

| | | | |
|---|---|---|---|
| 3,252,139 | 5/1966 | Moore | 340/146.1 BA |
| 3,480,910 | 11/1969 | Brenza et al. | 340/146.1 BA |
| 3,737,577 | 6/1973 | Birkin | 340/146.1 BA |
| 3,760,371 | 9/1973 | Pitroda et al. | 340/146.1 BA |
| 3,772,649 | 11/1973 | Haselwood et al. | 340/146.1 BA |
| 3,781,792 | 12/1973 | Birkin | 340/146.1 BA |

*Primary Examiner*—Charles E. Atkinson

*Attorney, Agent, or Firm*—Edward J. Norton; Joseph S. Tripoli

[57] ABSTRACT

A detector for repetitive cyclically permutable digital codes. The detector utilizes two shift registers, serially connected to provide two delayed versions of a repetitive code. A majority vote circuit responsive to the undelayed code and two delayed codes is used for forward error reduction. A run length counter responsive to the majority vote signal increments a count each time corresponding bits from the majority signal and a delayed version thereof agree. At a specified count, the code is read out with a high probability of accuracy.

16 Claims, 3 Drawing Figures

DETECTOR FOR REPETITIVE DIGITAL CODES

The invention herein described was made in the course of or under a contract or subcontract thereunder with the Department of the Army.

The present invention relates generally to digital code detectors and more specifically to a detector for a repetitive cyclically permutable code.

There are many instances where repetitive digital code are used. For example, in an all digital telephone system, especially in a secure digital telephone system, repetitive codes are used between one telephone station and the switching center and between telephone stations. Digital signaling, as compared to analog signaling, provides several advantages in terms of simplifying the switching equipment and in regenerating signal levels which will relate to the quality of transmission. Code detectors of the nature described herein are also useful in wide band data systems such as in the control and operation of a digital computer from a telephone station.

A problem arises, however, when one attempts to detect and decode in-band repetitive digital codes. The same line which carries the code also carries other digital data. Thus, one criteria for a digital code detector is that it must be able to distinquish between particular codes and the other data. In-band digital signaling could possibly cause what is called, in the art, a talk-off situation. Talk-off is a term which means that some particular traffic, being transmitted in the form of digital signals, is cut off because a detector has misconstrued the traffic to be some digital supervisory signal. The detection problem is further compounded by virtue of random errors arising from the structure of the system which tends to obscure the code detection process.

One obvious approach in a repetitive code system is to pass the incoming data stream through a shift register, whose length is the period of the code, and then compare corresponding bits of the undelayed code with the bits from the shift register. When the bits which are in agreement exceed those in disagreement, by a predetermined statistical criteria, then a valid code word is cnsidered to be present. However, because of even moderate bit error rates in the system, there is a low probability of tracking each bit in a sizable repetitive code.

Statistically, it can be shown that if one looks at a large sequence of bits and compares corresponding bits in a repetitive code and then increments a counter each time a match is found, and resets the counter when a mismatch occurs, then one should get a fairly good degree of accuracy in the code detection. An arrangement of the type described is called a run-length counter.

However, in a run-length counter system with a bit error rate (B.E.R.) of 10 percent, a probability analysis shows that an inordinately long average detection time is required to reach a final count in the run-length counter when a run is roughly five times the length of the code. Therefore, some type of forward error reduction is required. The present invention provides a digital detector for a repetitive code with a forward error reduction circuit to reduce the effective system bit error rate, insofar as the code detector is concerned, without increasing the talk-off tendency.

In accordance with the present invention there is provided a detector for detecting the presence of an incoming repetitive code. The code comprises N bits of digital information. A signal delay means is provided for delaying the N bits of the incoming code with a first and a second time delay. A majority vote means is provided which responds to the incoming code, the first time delayed code and the second time delayed code. The majority vote means provides bits which comprise a majority vote signal that is related to the nature of the majority of the corresponding bits in the incoming code, the first time delayed code and the second time delayed code. A run-length counter means is provided and is reponsive to the bits in the majority vots signal for advancing a count for one condition and for resetting the count for another condition. A means responsive to a specified count in the run length counter then provides an identification signal which corresponds to the particular incoming code.

Figure 1:
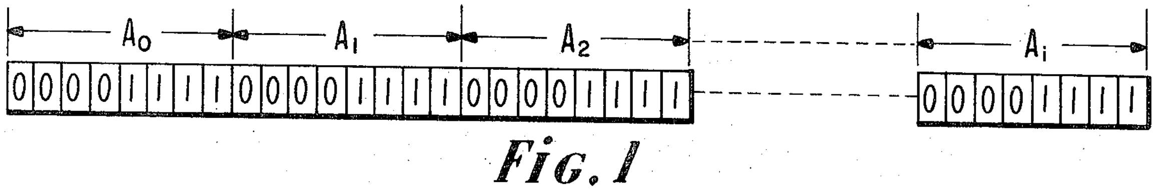
FIGS. 1 and 2 are sketches representing typical repetitive codes.

Referring now to FIG. 1, it will be seen that the code word in the present embodiment comprises 8 bits of digital information. These 8 bits are repeated cyclically in a particular transmission and each cycle is designated by $A_0$, $A_1$ through $A_t$. Likewise the code shown in FIG. 2 comprises 8 bits of digital information and the cycles are designated as $B_0$, $B_1$ through $B_t$.

Figure 2:
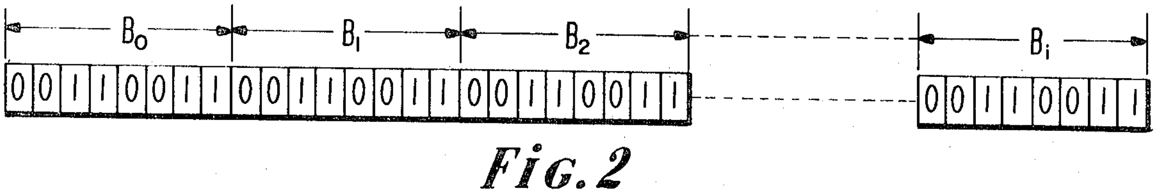

The codes shown in FIGS. 1 and 2 may, of course, be comprised of any numer of bits of digital information. In addition, in the preferred practice of the present invention, the codes, such as those shown in FIG. 1 and FIG. 2, are cyclically permutable. By this it is meant that no permutation of the 8 bits of one code word is the same as any permutation of the 8 bits of another code word. For example, in FIG. 1 four 0's are always followed by four 1's. In FIG. 2, two 0's are always followed by two 1's. It turns out that for an 8-bit word there are 256 combinations. Of these combinations there are 36 8-bit cyclically permutable words. It is desirable to use cyclically permutable codes because then one does not need to have specific framing information. In addition, there is also no way to permute one cyclically permutable code to look like any other.

Figure 3:
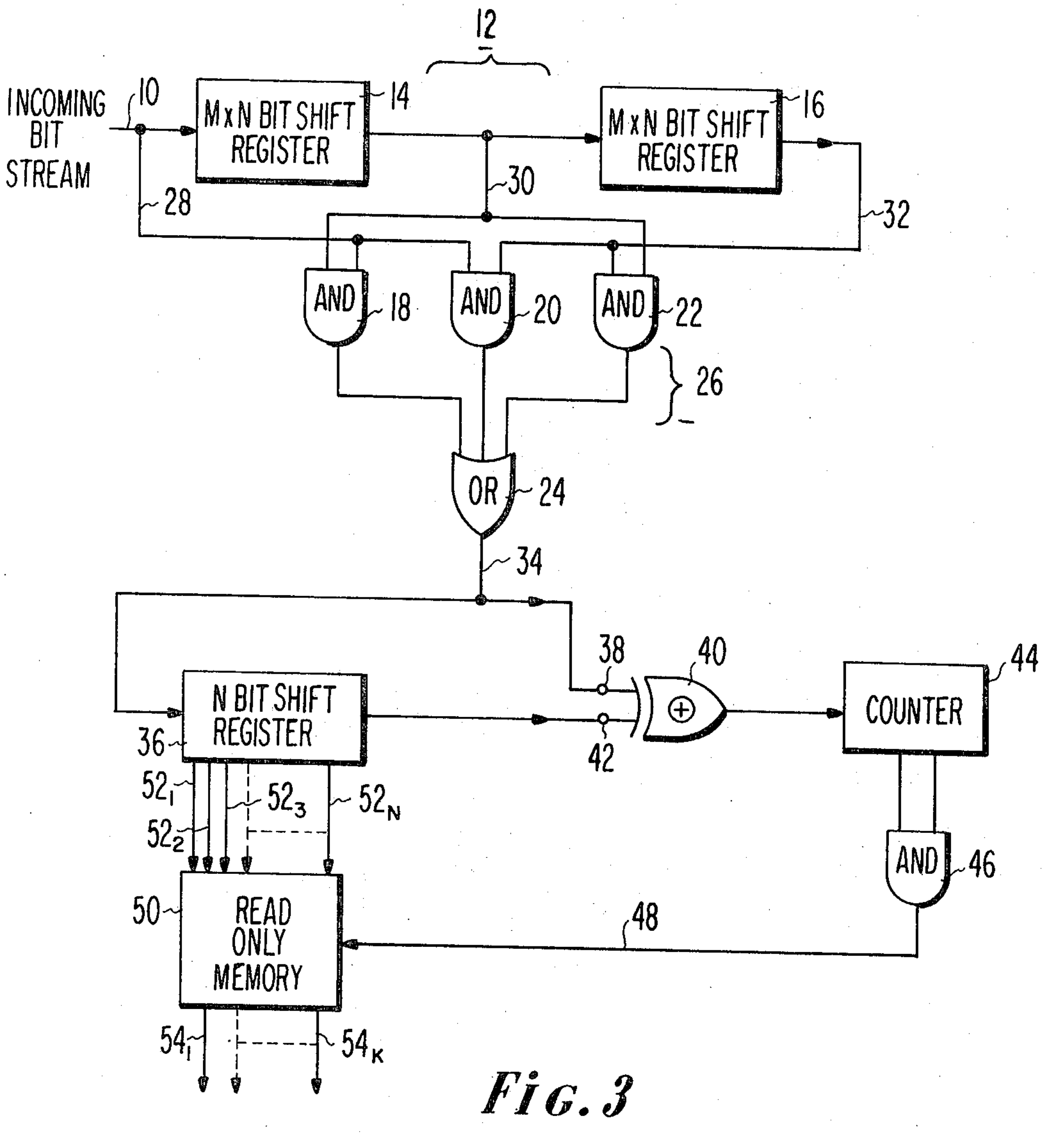
FIG. 3 is a partial block and partial schematic diagram of a preferred embodiment of the present invention.

Referring now to FIG. 3 an incoming bit stream is provided on line 10 to a code detector shown generally as 12. At various times the incoming bit stream will include repetitive codes of the type described with respect to FIGS. 1 and 2 and random data. The data is termed random since the sequence of binary 1'and 0's will have a random probability of occurrence depending upon the specific information contained therein. The incoming bit stream on line 10 is provided at a shift register 14. Shift register 14 is comprised of M × N stages, where N is equal to the number of bits in one cycle of the code and M is a selected positive integer. The criteria for selecting the value of integer M will be discussed more fully herein. Thus, the shift register 14 will provide some specific time delay to the incoming bit stream depending upon the number of stages contained therein. Shift register 14 is serially connected to a second shift register 16. In the present embodiment, shift register 16 is also comprised of M × N stages.

Thus, shift register 16 will also provide a time delay to the incoming bit stream.

AND gates 18, 20 and 22 together with OR gate 24 comprise a two out of three majority vote circuit 26. AND gate 18 has one input terminal connected directly to the incoming bit stream on line 10 and another input terminal connected to the output line of shift register 14. Thus, AND gate 18 is made responsive to the underlayed bit stream and the bit stream delayed by shift register 14. AND gate 20 has one input terminal connected to line 10 and a second input terminal connected to the output line of shift register 16. Gate 20 is thus responsive to the undelayed bit stream and to the bit stream which has experienced time delays from shift register 14 and shift register 16. AND gate 22 has a first input terminal connected to the output line of shift register 14 and a second input terminal connected to the output line of shift register 16. The output terminals of AND gates 18, 20, and 22 are each connected respectively to one of the three input terminals of OR gate 24.

The operation of the majority vote circuit 26 is as follows. When a repetitive code is coming in on line 10, the shift registers 14 and 16 will start to load up. Once shift registers 14 and 16 are fully loaded, the majority vote circuit 26 is prepared to commence voting. Since registers 14 and 16 provide delays which are integer multiples of the time duration for one cycle of the incoming code, and, since the code itself is being repeated many, many times, and assuming no errors are present, then the corresponding bits on the undelayed line 28, the first delayed line 30 and the second delayed line 32 should all be indentical. Thus, if the particular bit, say bit 1 of the code is 0 and a 0 appears on lines 28, 30 and 32 then each of the AND gates 18, 20 and 22 will supply OR gate 24 with a 0 and a 0 will appear on the output line 34 of OR gate 24. If, for some reason, there is a bit error and although the first bit of the code should be 0, a 1 appears on line 28 with 0's on lines 30 and 32, the majority vote circuit 26 will still provide the correct code answer on line 34. With a 1 on line 28 and a 0 on lines 30 and 32, the AnD gates 18, 20 and 22 will still provide all 0's to the OR gate 24 and hence a 0 will appear on line 34. Thus, with two out of three bits correct, the bit information on line 34 will still be correct.

Similarly, if the correct signal for bit number 1 in the code should be a 1 and a 1 in fact appears on lines 30 and 32 while a 0 appears on line 28, then AND gate 22 will detect the 1's from lines 30 and 32 and will provide a 1 to OR gate 24 which will appear on line 34. Thus, the majority vote circuit 26 should provide forward error reduction by eliminating some of the random errors which might occur during the transmission of the repetitive code.

There is a potential problem, however, in the utilization of the majority vote circuit 26. Assume for the moment that the quantity M in shift registers 14 and 16 has been selected to be one. Each of shift registers 14 and 16 is then comprised of 8 stages since the number of bits in the code word, N, is equal to 8. Now, assume that registers 14 and 16 are fully loaded. On the first majority vote thereafter circuit 26 will be voting on bits 1, 9 and 17. If the incoming bit stream on line 10 is at this time comprised of random data, then the bit resulting from the vote will have a random probability of being a 1 or a 0 and will appear on line 34. At a point 8 bits later circuit 26 will be voting on bits 9, 17, and 25. It will be noted that the second vote includes two bits which had been previously voted upon in the first vote. Statistically, if the input bits are random, this creates a 75 percent chance that the bit provided on line 34 from the vote 8 bits later will be the same as the bit provided on line 34 from the first vote. On the third vote in the current sequence, circuit 26 will vote on bits 17, 25 and 33. Again, since one of the bits in the third vote is the same as one of the bits in the first vote, a 62.5 percent chance arises that the bit resulting from the third vote will be the same as the bit resulting from the first vote, a 75 percent chance that the bit is the same as that resulting from the second vote. The potential problem is that this built-in bias may create a pattern which resembles a valid code word from random data.

It has been found that if one makes the integer quantity M in shift registers 14 and 16 greater than 1, the chance of creating a pattern out of a stream of random data is somewhat reduced. Actually, the larger the value of M, or in other words, the longer the delay in shift registers 14 and 16, the lower the probability of creating a pattern from random data. However, as one makes the delays in registers 14 and 16 greater, the minimum time required for processing and determining valid codes is also increased. It has been found that for an 8 bit code and a value of M = 2, that is, 16 stages in shift registers 14 and 16, the probability of creating patterns from random data is significantly reduced without an objectionably long processing time. A value of M = 4 will satisfy extremely stringent talk-off criteria.

Thus, it will be seen, that when the incoming bit stream on line 10 comprises a repetitive code word, the bits appearing on line 34, that is the majority vote signal, may be thought of as enhanced data. That is, the majority vote signal on line 34 will be a replica of the incoming code with a certain amount of error reduction already performed thereon. When the input is random data, the output data will be random if an adequate value of M is used.

The signals on line 34 are then coupled to an N bit shift register 36. In this case, of course, shift register 36 comprises 8 stages. In addition, the signals from line 34 are coupled to one input terminal 38 of an exclusive OR circuit 40. The other input terminal 42 of the gate 40 is coupled to the output terminal of shift register 36. Gate 40 performs the logical function of generating a 0 when the signals at terminals 38 and 42 are the same and generating a 1 at the output terminal of gate 40 when the signals at terminals 38 and 42 are different.

The signals generated from gate 40 are coupled to a counter 44 which advances the count by 1 each time a 0 is received from gate 40. When gate 40 generates a 1, counter 44 is reset to an initial state. In the present system the count in counter 44 is selected to go to 40 before the code is decoded. Thus, register 36, gate 40 and counter 44 comprise the elements of a run-length counter.

An AND gate 46 having its two input terminals connected to two stages of counter 44 is privided to detect the presence of a 40 count in counter 44. Thus, when counter 44 reaches the selected count an enable signal is generated at the output terminal of AND gate 46 which is coupled to line 48.

The enable signal on line 48 is coupled to a read only memory (ROM) unit 50. ROM unit 50 is addressed from shift register 36 via lines $52_1$ through $52_N$. The decoded output from ROM unit 50 is provided on lines $54_1$ to $54_k$ The operation of the circuitry just described is as follows. As the enhanced digital information is generated on line 34, shift register 36 is loaded. On the next incoming bit on line 34 gate 40 will compare corresponding bits of the code. That is, for example, the first bit from two cycles of the code will be compared. They should be the same. If they are, gate 40 generates a 0 and counter 44 is advanced by 1. The process continues until counter 44 reaches its specified count, in this case a count of 40. At this point shift register 36 is fully loaded with an 8 bit code which has been validated both by the majority vote circuit 26 and the run-length counter circuitry just described. Thus, when the enable signal is generated on line 48 the valid code in register 36 is available for addressing ROM 50. The decoded signal is then provided on lines $54_1$ through $54_k$. It should be noted that it is not required to have the same number of output lines $54_1$ through $54_K$ as input lines $52_1$ through $52_N$. Any convenient number of output lines for decoding purposes may be used. In addition, it turns out that with the utilization of ROM 50 one may have any permutation of the cyclically permutable code word in shift register 36 and still generate the proper decoded signal on lines $54_1$ through $54_k$. The ROM need not be powered until the presence of a code word is validated. With certain types of ROM's, this results in a significant powered saving. Also, if desired the validated code in register 36 may be read out to a central processor, instead of ROM 50, which would then decode the N bit pattern. The processor would not have to be interrupted until the detector determined that a valid code word was present.

In the embodiment of the invention described above where 8 bit cyclically permutable code words have been used, it has been found that in the presence of a randomly distributed 10 percent bit error rate, and extremely high probability of code detection is obtained in less than 64 repetitions or 512 bits of the code word. The probability of detection is on the order of 0.9999 and the talk-off, that is, false detection of code words in random data, has a mean recurrence rate in excess of 28 days at 38.4 kb/s, or a means recurrence rate of once every 92 billion bits. This was obtained with a value of $M = 4$ and a count of 40 used in the run-length counter. The present invention makes the 10 percent bit error rate look like an effective 2.8 percent bit error rate insofar as the detector 12 is concerned, with significantly increasing the talk-off tendency. Thus, an effective although relatively simple to implement detector has been described for the detection of repetitive digital codes with a short detection time in a noisy channel.

What is claimed is:

1. A detector for detecting the presence of an incoming repetitive code having N bits of digital information, said detector comprising:

signal delay means for providing said N bits of said incoming code with a first and a second time delay;

majority vote means responsive to said incoming code, said first time delayed code and said second time delayed code for providing bits comprising a majority vote signal related to the nature of the majority of the corresponding bits in said incoming code, said first time delayed code and said second time delayed code;

a run-length counter means comprising a counter and an N bit shift register responsive to the bits in said majority vote signal for advancing a count in said counter for one condition related to the majority vote bits and for resetting the count for another condition related to the majority vote bits and for providing said majority vote signal with an N bit delay; and means responsive to a specified count in said counter and to the N bits in said N bit shift register for providing an identification signal corresponding to the particular incoming code.

2. The detector according to claim 1 wherein said first time delay is an integer multiple of the time interval occupied by the N bits of said incoming code and wherein said second time delay is another multiple of the time interval occupied by the N bits of said incoming code.

3. The detector according to claim 2 wherein said signal delay means comprises first and second serially connected shift registers wherein each of said registers accommodates $M \times N$ bits, where M is a positive integer greater than one.

4. The detector according to claim 2 wherein said majority vote means comprises:

first, second and third AND gates each having two input terminals and an output terminal, said first AND gate being responsive to said undelayed version of said code and the version of said code from said first shift register, said second AND gate being responsive to said undelayed version of said code and the version of said code from said second shift register, said third AND gate being responsive to the versions of said code from the first and second shift registers; and an OR gate having three input terminals and an output terminal, said three OR gate input terminals being respectively connected to the output terminals of said first, second and third AND gates, the signal provided at the output terminal of said OR gate being said majority vote signal.

5. The detector according to claim 4 wherein said run-length counter means further comprises an exclusive OR gate for comparing the majority vote signal with the delayed majority vote signal provided by said N bit shift register.

6. The detector according to claim 5 wherein said count responsive means comprises a read only memory, said memory being addressed from said N bit shift register in response to said specified count in said counter means.

7. A detector for detecting the presence of an incoming repetitive code, said code comprising N bits of digital information, said detector comprising;

first delay means for providing the bits in said incoming repetitive code with a first and a second time delay;

means for providing an undelayed version of said repetitive code;

comparison means for comparing corresponding bits in any two of: (a) the undelayed code; (b) the first time delayed code; and (c) the second time delayed code and for providing a bit resulting from all comparisons made corresponding to the majority vote between (a), (b) and (c) related to the nature of the particular bits being compared;

storage and delay means for storing said majority vote bits and for providing said majority vote bits with a certain time delay;

means including a counter, responsive to the undelayed majority vote bits and to the corresponding delayed majority vote bits for incrementing said counter when a particular undelayed and corresponding delayed majority vote bit are the same; and means responsive to a specified count in said counter and to the majority vote bits stored in said storage and delay means for decoding said incoming repetitive code.

8. The detector according to claim 7 wherein said first delay means comprises first and second serially connected shift registers and wherein each of said registers accommodates M = N bits, where M is a positive integer greater than one.

9. The detector according to claim 8 wherein said comparison means comprises:

first, second and third AND gates each having two input terminals and an output terminal, said first AND gate being responsive to said underlayed version of said code and the version of said code from said first shift register, said second AND gate being responsive to said underlayed version of said code and the version of said code from said second shift register, said third AND gate being responsive to the versions of said code from the first and second shift registers; and an OR gate having three input terminals and an output terminal, said three OR gate input terminals being respectively connected to the output terminals of said first, second and third AND gates, the signal provided at the output terminal of said OR gates being said majority signal.

10. The detector according to claim 9 wherein said storage and delay means comprises an N bit shift register.

11. The detector according to claim 10 wherein said count responsive means comprises a read only memory, said memory being addressed from said N bit shift register in response to said specified count.

12. A detector for detecting the presence of an incoming repetitive code, said code comprising N bits of digital information, said detector comprising:

first signal delay means for providing said N bits of said incoming code with a first time delay;

second signal delay means for providing said N bits of said incoming code with a second time delay;

means for providing an underlayed version of said incoming code;

first means for compraing the corresponding bits in said repetitive code between any tow of: (a) said undelayed version of said code; (b) the version of said code having said first time delay; and (c) the version of said code having said second time delay, said comparing means providing first, second and third intermediate signals, respectively resulting from the comparisons of any two of (a), (b) and (c), said first comparing means further comprising means responsive to said first, second and third intermediate signals for providing a majority signal corresponding to the majority vote as to the nature of the bits in (a), (b) and (c);

signal storage and delay means for storing said majority signals and for providing said majority signals with a particular delay;

second means for comparing said delayed majority signals with an undelayed version of said majority signals and for providing one signal when the delayed and undelayed majority signals are the same and another signal when the delayed and undelayed majority signals are different;

counter means responsive to said one signal for incrementing a count and responsive to said other signal for resetting said count to an initial value; and means responsive to a specified count in said counter means and to the majority signals stored in said storage and delay means for providing a signal corresponding to a decoded version of said code.

13. The detector according to claim 12 wherein said first and second delay means comprise first and second serially connected shift registers and wherein said first and second time delays are equal to each other and wherein each of said registers accommodates M = N bits, where M is a positive integer greater than one.

14. The detector according to claim 13 wherein said first means for comparing comprises;

first, second and third AND gated each having two input terminals and an output terminal, said first AND gate being responsive to said underlayed version of said code and the version of said code from said first shift register for providing said first intermediate signal, said second AND gate being responsive to said undelayed version of said code and the version of said code from said second shift register for providing said second intermediate signal, said third AND gate being responsive to the versions of said code from the first and second shift registers for providing said third intermediate signal; and an OR gate having three input terminals and an output terminal, said or gate being responsive to said first, second and third intermediate signal for providing at the output terminal thereof said majority signal.

15. The detector according to claim 14 wherein said signal storage and delay means comprises an N bit shift register and wherein said second comparing means comprises an exclusive OR gate.

16. The detector according to claim 15 wherein said count responsive means comprises a read only memory, said memory being addressed from said N bit shigt register in response to said specified count in said counter means.

* * * * *

UNITED STATES PATENT OFFICE
CERTIFICATE OF CORRECTION

PATENT NO. : 3,863,215

DATED : December 8, 1974

INVENTOR(S) : Ellwood Patrick McGrogan, Jr.

It is certified that error appears in the above-identified patent and that said Letters Patent are hereby corrected as shown below:

Col. 1, line 10, "code" should be --codes--

Col. 2, line 12, "vots" should be --vote--

Col. 2, line 29, "$A_1$" (second occurrence) should be --$A_i$--

Col. 4, line 63, "privided" should be --provided--

Col. 5, line 42, "and" should be --an--

Col. 5, line 53, "with" should be --without--

Col. 7, claim 12, line 56, "tow" should be --two--

Col. 8, claim 16, line 57, "shigt" should be --shift--

Signed and Sealed this

*twenty-ninth* Day of *July 1975*

[SEAL]

*Attest:*

RUTH C. MASON
*Attesting Officer*

C. MARSHALL DANN
*Commissioner of Patents and Trademarks*